J. H. STEWART.
AEROPLANE.
APPLICATION FILED MAR. 10, 1919.

1,398,750.

Patented Nov. 29, 1921.
4 SHEETS—SHEET 1.

INVENTOR.
John H. Stewart
BY
Allen + Allen
ATTORNEY.

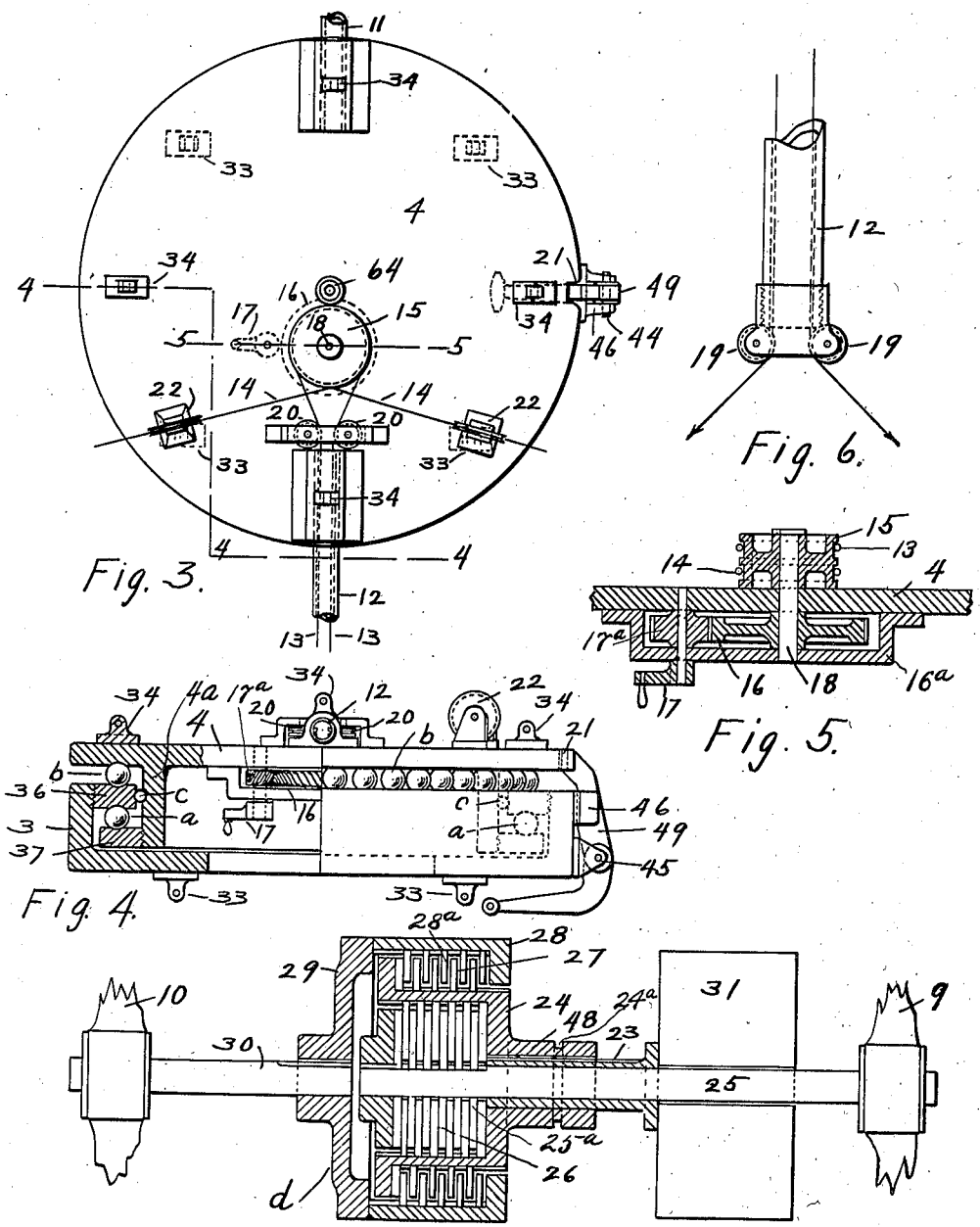

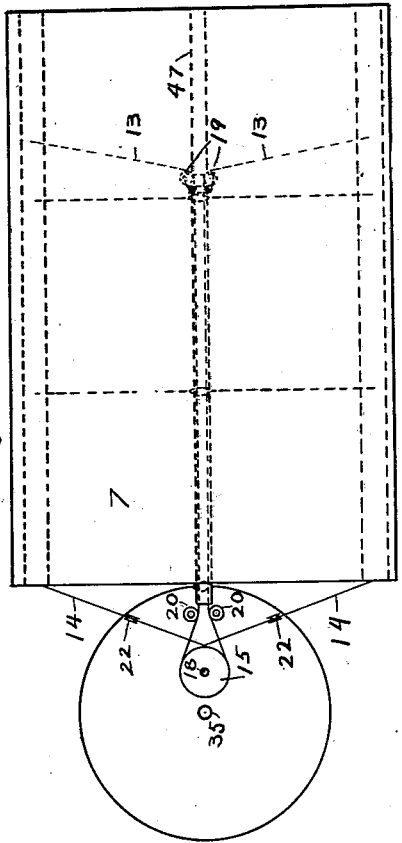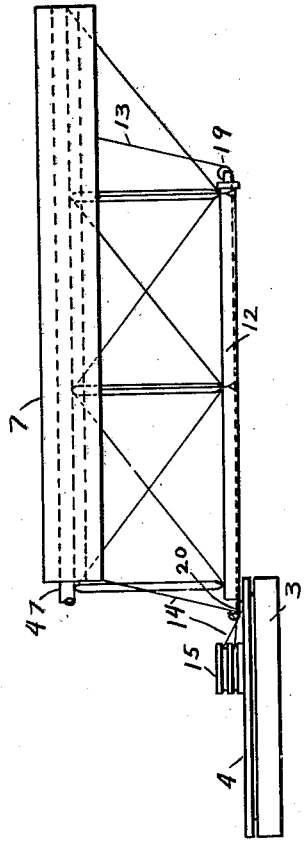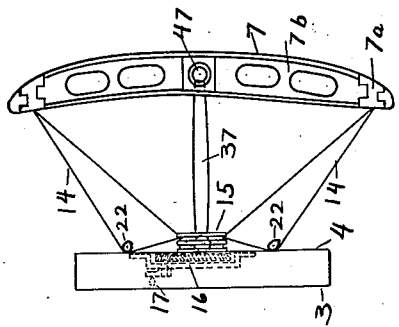

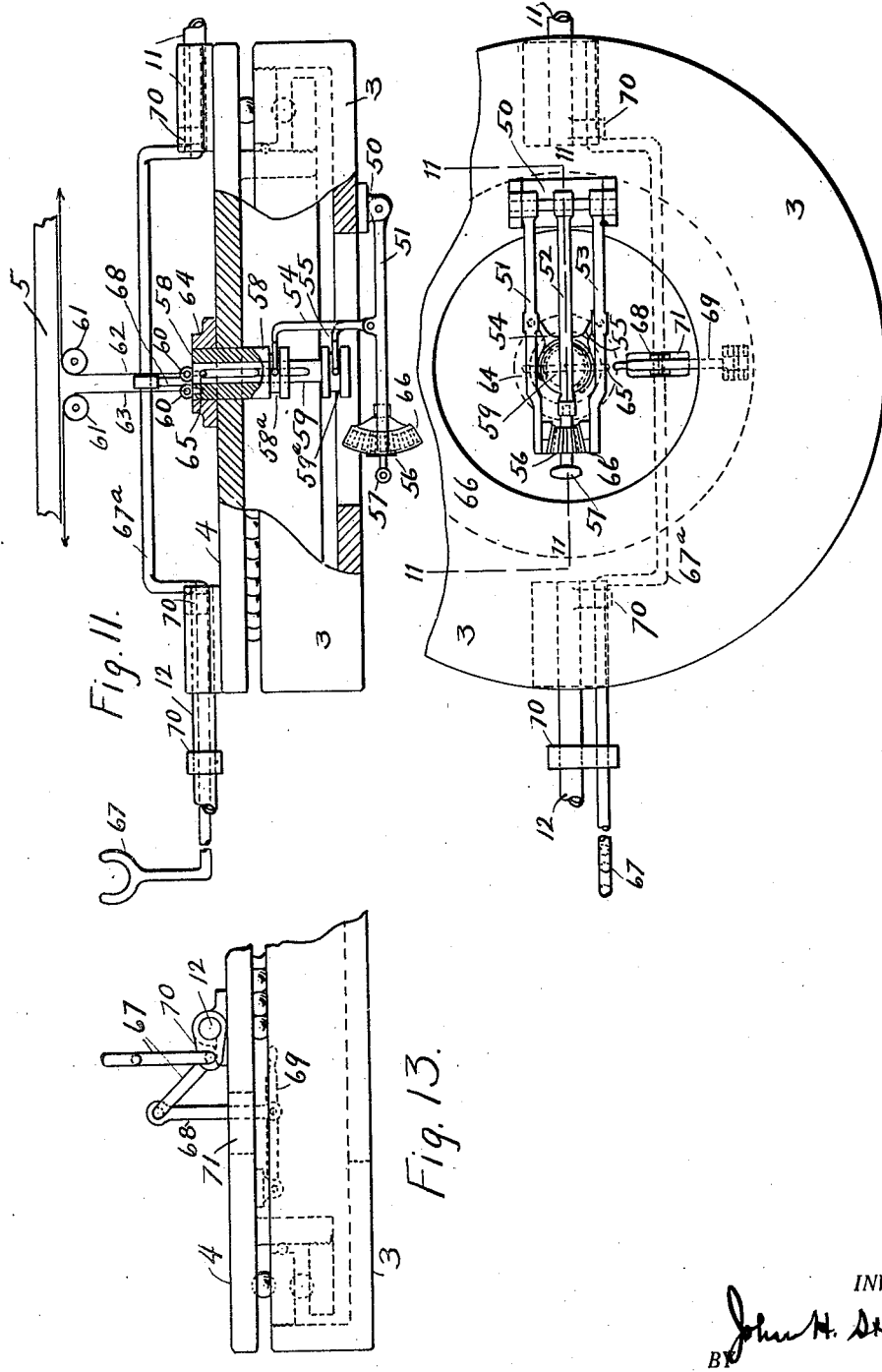

UNITED STATES PATENT OFFICE.

JOHN H. STEWART, OF CINCINNATI, OHIO.

AEROPLANE.

1,398,750.   Specification of Letters Patent.   Patented Nov. 29, 1921.

Application filed March 10, 1919. Serial No. 281,665.

*To all whom it may concern:*

Be it known that I, JOHN H. STEWART, a citizen of the United States, and a resident of Cincinnati, in the county of Hamilton and State of Ohio, have invented certain new and useful Improvements in Aeroplanes, of which the following is a full, clear, and exact description, reference being had to the accompanying drawings, forming part of this specification.

My invention relates to aeroplanes and has for its object the provision of a heavier-than-air flying machine which is capable of perpendicular movement based on the helicopter principle, so that rising and alighting can be made from a restricted space, without running first along the ground or other supporting surface, whereby the possibilities of commercial use of aeroplanes will be greatly advanced.

In devices of the prior art, the helicopter principle, *i. e.*, the use of a vertical screw, has been utilized in flying machines, but so far as I am aware no success has been met with in these prior devices, due to several features. So far as I am aware, for example, no prior machine has ever been able to hover, or remain in the air over a given spot on the earth's surface, without regard to the influence of air currents, or to rise through the air without drifting with the wind. Neither has any practical or successful method been devised of converting a helicopter into a horizontal flier.

According to my invention, however, the upper plane, which is preferably utilized as the helicopter, may be converted into the normal type of upper plane while in the air, and without stopping the flight of the machine, or letting it fall, so that except for the necessary rigging and driving mechanisms, there is no substantial difference between my device and any desired form of biplane. I provide separate motor drive and propellers for the upper plane when used as a helicopter, and in addition a normal lower plane and drive. This in connection with the convertibility above mentioned enables me to utilize my helicopter motors for normal flying and gives my machine an additional factor of safety, as well as extranormal power as will be described.

The outstanding feature of my invention is that I provide a normal aeroplane with normal drive, and in addition thereto a helicopter which operates at the same time or separately from the aeroplane, or is convertible into part of the aeroplane. Thus I am enabled to drive my machine against the wind with sufficient force to just neutralize the air current, and at the same time revolve my helicopter to move my machine perpendicularly, up or down. Not only this, but I am enabled to stop the operation of my helicopter in the air, while the machine is in flight and supported by the lower plane and the main propeller thrust, and reconvert it into a normal upper plane without running the danger of dropping through the air at the same time, which would be the case if the helicopter were the only means of support, or if the helicopter driving means were the only driving means for the aeroplane.

It is my object in addition to provide certain operative connections, bearings and assemblages of parts, which I conceive to be of particular value in this new type of machine which I have invented, and the advantages of which will be noted in the matter below. The various objects and advantages above set forth I accomplish by that certain construction and arrangement of parts to be hereinafter more specifically pointed out and claimed.

In the drawings,

Fig. 3 is a top plan view of the antifriction bearing connecting the upper rotating wings with the lower portion of the apparatus.

Fig. 4 is a side elevation of this same bearing, showing the construction thereof, by a partial cross section on the line 4, 4, of Fig. 3.

Fig. 5 is a cross section view through the line 5, 5, of Fig. 3, showing the construction of the mechanism for controlling the angle of setting of one of the upper rotating wings.

Fig. 6 is a detail showing the method of leading the wing angling cables through one of the supporting tubes.

Fig. 7 is a longitudinal section through the clutch employed for shifting the power from a leading to a trailing propeller on one of the rotating wings.

Figs. 8, 9 and 10 are details in top plan, side and end elevations respectively, showing the method of bracing and controlling the tiltable wing.

Fig. 11 is a side elevation of the antifriction bearing, broken away on the line 11, 11, of Fig. 12 to show the throttle controlling mechanism for the helicopter engines.

Fig. 12 is a bottom plan view thereof, showing said detail.

Fig. 13 is a detail end elevation, showing the method of mounting the clutch operating device on the adjustable wing.

Figure 2:
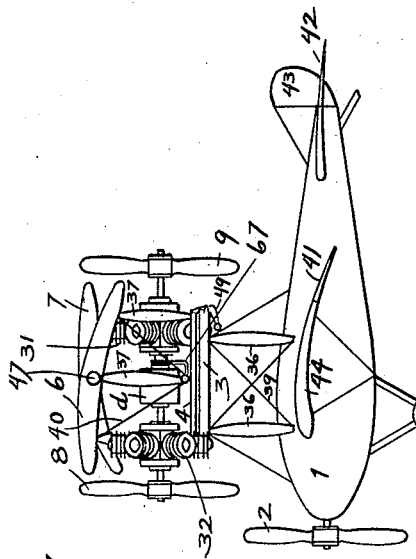
Fig. 2 is a side elevation of the same.
Figure 1:
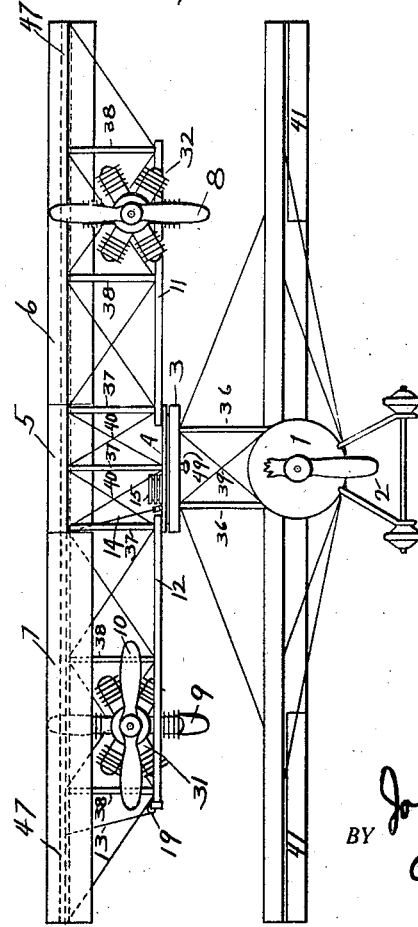
Figure 1 is a front elevation of the complete apparatus.

As shown in the drawings, the fuselage 1 and the propeller 2 mounted and driven so as to rotate in advance of the fuselage, can be taken as representing any desired form of fuselage and propeller. Extending laterally from the fuselage are the two wings 44 constituting a plane, having suitable camber and inclination, same equipped with ailerons 41 of the desired type. The fuselage 1 has on its rear end the rudder 43 and the elevator 42. The above described parts will be understood to be all shown as representations of the well known parts bearing these names, no effort being made to show any special forms of these parts. The motor for the propeller 2, which I will refer to as the main propeller, is not shown, but it will be understood that it will be provided and suitably mounted in the fuselage of the device and controlled in the usual manner.

The plane, which is employed as the helicopter, is shown as the only remaining plane of the device, but it is not meant by this to exclude from my invention triplanes, or other arrangements of planes to accomplish desired results in connection with my invention. This upper plane comprises wings 6 and 7 and a central section 5. One of the said wings, to wit: the wing 7 is shown as adjustable on its horizontal axis, so as to vary its inclination to the line of thrust of the aeroplane, although this adjustable feature might be applied to both wings, if desired. Both wings are shown as constructed in the same manner, however, and comprise the spars 7ª and ribs 7ᵇ, with the tubular metal bar 47, which may extend through the whole length of the upper plane serving as a spar. The non-adjustable wing 6 is mounted by means of wires and struts 38 to a tubular bar 11, in the usual manner. In the instance of the adjustable wing, however, the struts 38 connect the bar 47 with the bar 12 corresponding to the bar 11 of the other wing. The wing 7 is, however, free to pivot on the rod 47 and instead of the usual bracing wires, the wires 13, 13, for the outer end, and the wires 14, 14, for the inner end are secured to the leading and trailing edges of this wing.

The central section 5 of the plane is secured by means of struts 37 and wires 40 to the upper half 4 of the antifriction bearing that connects the fuselage and helicopter plane, utilizing the lugs 34 on the upper side of said part 4. Each of the wings 6 and 7 has suitably supported beneath its surface a motor, as shown at 31 and 32 respectively, and the motor 32 for the wing 6 has the propeller 8 of the type desired.

The motor 31 for the wing 7 has, however, driving connections, as will be noted, to two propellers 9 and 10, the former at the trailing edge of the wing 7.

*The rotatable support for the upper plane.*

The member 4 on which the central section 5 of the upper plane is mounted, has a depending annular ring 4ª, to the lower end of which is screwed the horizontally disposed ring 37. The under half 3 of the antifriction bearing, or rotatable support for the upper plane, has an upwardly extending annular flange or ring thereon, same having a ring 36 threaded into its interior. This arrangement of interlocking rings provides raceways for three sets of antifriction balls $a$, $b$ and $c$. The balls $c$ protect against lateral thrust, the balls $b$ against downward thrust and the balls $a$ against upward thrust. In this way the member 4 of the antifriction bearing is free to rotate without any binding strains on the lower part 3 thereof.

The part 3 of the bearing is mounted on the fuselage 1, and the above parts thus provide a bearing for the upper plane on the fuselage. To lock the upper plane against rotation, there will be provided some sort of lock, such as the bell crank 49 pivoted at 45 to the part 3, abutted by the lug or lugs 46 on the part 3 and letting into a slot 21 in the upper portion. Although this lock is merely indicative of a means for securing the two parts of the bearing together to prevent rotation, it can be seen that the abutting lug above referred to gives great strength to the lock which, it will be readily understood, has to undergo considerable strain.

The lower section 3 of the bearing is secured by means of guy wires 39, struts 36 and lugs 33 on the underside thereof, to the fuselage of the machine and the lower wings. The length of the struts is such that the driver can readily reach up to the section 3 of the bearing. The hollow tubes or bars 11 and 12 are secured suitably to the member 4, the whole therefore providing a rotatable bearing which secures the upper part of the plane to the fuselage, permitting free rotation between said fuselage and upper section.

*The device for operating the movable plane.*

As can be readily understood, to accomplish the revolution of the upper plane, the motors 31 and 32 are operated, and the propellers 9 and 8 driven, which will rotate the upper structure on the bearings 3, 4. At the same time the wing 7 must be tipped oppositely to the wing 6, so that both wings thrust downwardly against the air. However, when using the upper plane in its normal manner, the wing 7 must be at a like angle of incidence to the wing 6.

It was noted above that this wing 7 was movable and rocked on its central bar, or spar 47. It was noted also that the wires 13 and 14 were secured to the leading and trailing edges of the wing 7.

These wires 13 are carried over pulleys 19 mounted over the end of the tube 12 (Fig. 6) in any desired manner, and pass through the tube 12 and out over pulleys 20 held in a suitable bracket over the inner end of said tube. It will be noted that the pulleys 19 and 20 are arranged so that the wires do not contact with the sides of the pipe and thus become subjected to wear.

The wires 14 are led from the inner edges of the wing 7 over vertically mounted pulleys 22 on the upper member 4 of the bearing.

Both wires are led over a double pulley 15 and secured thereto so that the revolving of this pulley will result in winding up equally on either side of the wing 7, thus tipping it forwardly or rearwardly of the machine.

A stub shaft 18 extends through the bearing member 4 and is secured fast to the pulley 15, while beneath the member 4 it carries a worm gear 16. The worm gear is surrounded by a casing 16ª mounted beneath the member 4, which casing also supports the lower end of the shaft 18. Within the casing is mounted in mesh with the gear 16 a worm pinion 17ª carried on a suitable shaft which extends down through the casing 16ª, and is equipped with an operating handle 17.

The handle 17 is within the reach of the driver of the machine and by turning it, the worm gear train above described will revolve the pulley 15 and tilt the wing 7 as desired. It should be noted that this device is more or less diagrammatic in its details, but that the worm gears provide a self-locking operating member for the wing, which will not give under strain, tending to tilt the wing, and which is readily operable from the driver's seat in the fuselage.

*Throttle control for helicopter motors.*

While the connections with the motors 31 and 32 of the wings 6 and 7 are not shown, it will be understood that the throttle control of these motors will be by means of cables 63, 62 (Figs. 11, 12 and 13), which pass along the center spar 47 of the upper plane. The cables or wires 62, 63, are connected by means of hooks 60 to concentric shafts 58 and 59 respectively.

The shaft 58 is mounted in the member 4, said member having the auxiliary journal plate 64 thereon for this purpose, and held against rotation by means of a pin 65, sliding in a suitable groove in the member 4. The shaft 59 slides in like manner, but does not rotate in the shaft 58. The shafts are suitably grooved at 58ª and 59ª respectively to receive pronged links or forks 54, 55, respectively.

The forks 54 and 55 are mounted on levers 51, 53, respectively, which said levers are pivotally mounted on the shaft 50 on the member 3 of the main bearing. Between the two levers is another lever 52, which carries rotatably on its outer end a beveled pinion 56, same being connected to an operating handle 57.

Each of the levers 54 and 55 has a beveled segment gear 66 adjacent and in mesh with the pinion 56 on either side thereof, so that the revolution of the pinion will raise one lever and lower the other. A straight upward thrust or downward pull on the handle 57 without revolving it, will, however, result in a simultaneous raising or lowering of the levers 54 and 55.

The motion of the levers, as has been described, is communicated to the concentric shafts and through them to the control wires 61 and 62 and to the throttles of the two engines. The operator can thus obtain any desired adjustment or relative adjustment of the throttles of the two upper motors that he may desire, the handle 57 being well within his reach from his seat in the fuselage. Also due to the revoluble connection of the levers to the shafts, by means of the forks and grooves, the control is not affected by the revolution of the upper bearing member on the lower, and the operator does not have to operate a moving part when controlling the motors of the upper plane while it is operating as a helicopter.

*The clutch for the motor 31.*

It will be remembered that the motor 31 is equipped with two propellers, the propeller 10 at the leading edge of the wing 7 and the propeller 9 at the trailing edge. The propeller 10 is driven by a shaft 30 and the propeller 9 is driven by a shaft 25. A clutch device transmits power from the motor 31 to either shaft, as desired.

As shown in Fig. 7, the motor 31 has fixedly connected to and driven by it, the hollow shaft 23, to which is splined at 48 a casing 24, so that said casing rotates with, but is slidable on the said hollow shaft. The casing 24 has an exterior set of steel disks 27 and an interior set of like disks 26.

The shaft 25 passes through the hollow shaft 23 to the propeller 9, and is equipped with the disks 25ª which lie adjacent to the disks 26 on the slidable casing. The shaft 30 has keyed to it a plate 29, which carries a casing 28. The casing 28 has a set of steel disks 28ᵃ which lie adjacent the disks 27 exterior the slidable casing. The relative positions of the disks are so arranged that a movement of the casing 24 toward the propeller 10 will drive the propeller 9 by the disks 26 and 25ᵃ frictionally engaging each other. The movement of the casing 24 toward the propeller 9 will drive the propeller 10 and release the propeller 9, through the disks 27, 28ᵃ frictionally engaging and the outer set of disks being removed from engagement.

This device is partly diagrammatic in its showing, and intended to illustrate a method of driving either propeller from the motor 31, and also cutting out both propellers at the same time when desired.

For operating the clutch, a fork 67 (Figs. 11, 12 and 13) engages loosely in the groove 24ᵃ in the sliding clutch member 24. This fork is held on a rod 67ᵃ, which is rotatably held on the bar 12 of the ring 7, by means of brackets 70. This rod 67ᵃ has a crank portion above the rotatable member 4, to which crank portion is pivoted a link 68 which passes through the slot 71 in the said bearing member 4. A lever 69 pivoted on the under side of the member 4 is connected to the link 68, and by this means the rod 67ᵃ is readily rocked by the operator to shift the drive of the motor 32 from the propeller 9 to the propeller 10.

*Operation of the device.*

In the device now described, the rotatable upper wings, as has been noted, operate as a helicopter, when the driver releases the lock of the rotatable bearing, winds up on the handle 17 to tilt the wing 7 toward the leading edge of the machine, throws the clutch so that the propeller 9 operates with the motor 31 of said wing 7, and opens the throttles of both motors 31 and 32. This results in the upper wings acting as a giant propeller, containing its own power plant, so as to lift the machine when rotated at the proper speed. Due to the opposed angles of incidence of the two wings and the opposed driving effect of the two propellers 9 and 10, the thrust will be vertical when the helicopter as a whole is caused to revolve.

To overcome the tendency to drift with the wind, if one should be blowing, the main propeller 2 is utilized to drive the whole device forward, with the lower plane acting as a monoplane would act, unless of course it should be found desirable to have two fixed planes and adapt the third plane to act as a helicopter, when the two fixed planes would operate as a biplane. In rising from the ground, or at any time to maintain a fixed position over the ground, the propeller 2 will be driven with just enough force to counteract the force of the wind. Also the force of the propeller 2 can be utilized to drive the machine forward with relation to the ground, as well as merely to neutralize the wind. Tendency of the machine to tip sidewise can be counteracted by the use of the usual stabilizing devices with which the lower plane is equipped, and the steering of the device is likewise accomplished in the usual manner.

When it is desired to cut out the helicopter, the engine 32 is throttled down, and the clutch thrown to supply force to the propeller 9, opposed to the rotation of the helicopter. This will gradually stop the helicopter, and the machine will be held in the air by the main drive and the lower plane. The lock is thrown as soon as the helicopter has come to the proper position and has stopped its rotation, or practically done so. As soon as the helicopter has been locked, or prior thereto, if desired, the wing 7 is tilted back to the same angle of incidence as the wing 6, and both motors 31 and 32 may then be employed to drive the machine forward in the usual manner.

For alighting, the procedure is reversed, and the lower plane is designed to fully support the device in the air during changes of the upper plane from normal to helicopter position and drive.

It can be observed that there are three separate motors for the machine, and thus a great guarantee is provided against total loss of propelling force, which is of itself a considerable factor of safety in this device. The proper stabilizing of the machine is a matter of design. It has not been attempted to describe in detail or show in the drawings the exact proportions of the parts of the machine, nor the exact details of the connections thereof, since these matters are purely matters of design. It might even be found desirable to mount the helicopter device below the fuselage instead of above it.

The machine might be used with a single motor for both upper propellers, with a chain drive, or the like, without departing from the principle of my invention. The main point of the invention, as has been noted, is the provision of a helicopter for an aeroplane, and also the provision of an aeroplane operating on known principles, which can drive forward at the same time that it is rising vertically, both forces under ready control of the driver of the machine. Moreover there is supplied an aeroplane which can maintain itself in the air while the helicopter is not working, or is being converted into a straight flying plane, including, of course, a design of the helicopter which permits of its use as a regular and normal plane of a flying machine.

As I have noted also, the invention provides a helicopter which is readily controlled from a normally stabilized source, and which carries its own power plant. The bearing shown, by which the upper and lower planes are connected is a special feature of the invention also, as it provides a connection of the helicopter to the main body of the machine, and takes care of all strains upward, downward and lateral.

Having thus described my invention, what I claim as new and desire to secure by Letters Patent is:

1. The combination of an aeroplane comprising in part laterally extending planes with ailerons, driving motor and propeller and a separate helicopter construction revolubly mounted thereon, in fixed relation thereto, and means for converting said helicopter into a normal flying plane.

2. The combination of an aeroplane comprising in part laterally extending planes with ailerons, driving motor and propeller and a separate helicopter construction revolubly mounted thereon, in fixed relation thereto, the helicopter having an independent power plant and propelling element, and means for converting said helicopter into a normal flying plane.

3. The combination of an aeroplane comprising in part laterally extending planes with ailerons, driving motor and propeller, and a helicopter revolubly mounted thereon, in fixed relation thereto, said helicopter being adapted to be converted into a normal flying plane, the helicopter having an independent power plant and propelling element, and said helicopter propelling element being convertible into a propelling element for such normal flying plane.

4. The combination of an aeroplane comprising in part laterally extending planes with ailerons, driving motor and propeller, and a separate helicopter construction revolubly mounted thereon, in fixed relation thereto, the helicopter having an independent power plant and propelling element, with means for converting said helicopter into a normal flying plane and controlling means for the aeroplane and the helicopter independent of each other.

5. The combination with an aeroplane comprising in part laterally extending planes with ailerons, driving motor and propeller, of a separate helicopter construction revolubly mounted thereon, said helicopter having two wings, with one of the wings at least being tiltably mounted so as to be adjustable to angles of incidence alike and opposed to the other wing.

6. The combination with an aeroplane comprising in part laterally extending planes with ailerons, driving motor and propeller, of a helicopter revolubly mounted thereon, said helicopter having two wings, with one of the wings at least being tiltably mounted so as to be adjustable to angles of incidence alike and opposed to the other wing, each of said wings having a propeller.

7. The combination with an aeroplane of a helicopter revolubly mounted thereon, said helicopter having two wings, with one of the wings at least being tiltably mounted so as to be adjustable to angles of incidence alike and opposed to the other wing, each of said wings having a propeller, and one of said wings having an additional propeller positioned at the opposite edge of the said wing from the first propeller, and means for applying power to said propellers.

8. The combination with an aeroplane comprising in part laterally extending planes with ailerons, driving motor and propeller, of a separate helicopter construction revolubly mounted thereon, said mounting comprising a member secured to the aeroplane, a member secured to the helicopter, and bearings between said members to receive lateral, upward and downward strains.

9. The combination with an aeroplane of a helicopter revolubly mounted thereon, said mounting comprising a member secured to the aeroplane, a member secured to the helicopter, and bearings between said members to receive lateral, upward and downward strains, and means for locking said bearings to prevent rotation of said helicopter with relation to the aeroplane.

10. The combination with an aeroplane comprising laterally extending planes with ailerons, driving motor, propeller and fuselage and a separate helicopter construction, of a plate mounted on the fuselage, an interlocking plate therefor on the helicopter, and bearings between said interlocking plates adapted to receive lateral, upward and downward strains between said plates.

11. The combination with a flying plane, a helicopter, and a fuselage therefor, of a plate on the fuselage, a plate on the helicopter, vertically extending annular flanges on said two plates, an inwardly extending annular member on the larger of said flanges, an outwardly extending annular member on the smaller of said flanges, whereby an interlocking construction is provided between the two plates, and rollers or balls set between said laterally extending members, and between one of said members and one of the plates, and a third set of balls between the smaller of the flanges and the inner edge of one of the laterally extending members, for the purpose described.

12. The combination with a fuselage, and a helicopter mounted thereon, of a rotatable bearing between the fuselage and the helicopter, driving motors for the helicopter, mounted thereon, and controlling connections for said driving motors adapted to pass through said bearing, so as to be operable from the fuselage.

13. The combination with an aeroplane comprising laterally extending planes with ailerons, driving motor, propeller and fuselage, and a separate helicopter construction mounted thereon, of a rotatable bearing between the fuselage and the helicopter, driving motors for the helicopter, mounted thereon, and controlling connections for said driving motors, comprising in part separate means for each motor slidable with reference to each other but nonrotatable with the helicopter section of the bearing, and means on the nonrotatable part of the bearing engaging said last mentioned means to shift same while permitting rotation thereof.

14. The combination with an aeroplane comprising laterally extending planes with ailerons, driving motor, propeller and fuselage, of a helicopter revolubly mounted thereon, said helicopter having two wings, with one of the wings at least being tiltably mounted so as to be adjusted to angles of incidence alike and opposed to the other wing, and means for operating said tiltable wing located adjacent the center of rotation of said helicopter and within the driver's reach of the fuselage.

15. The combination with an aeroplane, of a helicopter revolubly mounted thereon, said helicopter having a single propeller at one edge on one of the wings thereof, and two propellers on opposite edges of the opposite wing thereof, and means for applying power to either one of said opposed propellers, for the purpose described.

16. The combination with a fuselage, of a helicopter revolubly mounted thereon, said helicopter having one of its wings equipped with opposed propellers one on the leading and one on trailing edges of said wing, a clutch for transmitting power to either of said propellers as desired, and means mounted adjacent the center of revolution of said helicopter for controlling said clutch, said means being within driver's reach from the fuselage.

17. The combination of an aeroplane and a helicopter revolubly mounted thereon, said helicopter having two opposed wings, and a propelling element for each wing, one of said wings having a double propelling element to alternately drive at the trailing or leading edges of said wing.

JOHN H. STEWART.